United States Patent [19]

Youssef

[11] Patent Number: 4,918,863
[45] Date of Patent: Apr. 24, 1990

[54] METHOD AND APPARATUS FOR PLANTING SEEDS AND GROWING PLANTS

[76] Inventor: Nabil N. Youssef, 2168 N. 1450 East, North Logan, Utah 84321

[21] Appl. No.: 291,550

[22] Filed: Dec. 29, 1988

Related U.S. Application Data

[63] Continuation of Ser. No. 450,783, Dec. 17, 1982.

[51] Int. Cl.$^5$ ................................................ A01G 9/02
[52] U.S. Cl. .......................................... 47/85; 47/74; 47/77
[58] Field of Search ................. 47/9, 29, 73, 74, 77, 47/78, 86, 87

[56] References Cited

U.S. PATENT DOCUMENTS

| | | | |
|---|---|---|---|
| 3,834,074 | 9/1974 | Shirouzu | 47/85 |
| 4,111,585 | 9/1978 | Mascaro | 47/86 X |
| 4,231,186 | 11/1980 | Ruuska | 47/74 |
| 4,272,919 | 6/1981 | Schmidt | 47/9 X |
| 4,377,919 | 3/1983 | Gams | 74/1 R |
| 4,768,307 | 9/1988 | Holowecky | 47/29 |

OTHER PUBLICATIONS

Greenhouse Handbook for the Amatuer; Brooklyn Botanic Gardens; pp. 84 and 85 (1963).

Primary Examiner—Mickey Yo
Assistant Examiner—Lynda M. Cofsky
Attorney, Agent, or Firm—A. Ray Osburn

[57] ABSTRACT

A method and associated apparatus for planting seeds and growing plants wherein the seeds are planted in a germinating soil mix in a group of adjoining enclosures placed upon a substrata of virgin soil or other plant nutrient medium, the plant roots growing directly into the substrata, with no replanting. The enclosure group provides a plant spacing reference, so that the growing area is efficiently used, and the germinating soil mix may be sterile so that cultivation for weed control after planting is not necessary. For storage compactness and economy, expandable honeycomb paper may be utilized for the enclosure group.

6 Claims, 3 Drawing Sheets

METHOD AND APPARATUS FOR PLANTING SEEDS AND GROWING PLANTS

BACKGROUND OF THE INVENTION

RELATED APPLICATION: This application is a continuation application based on co-pending application Ser. No. 04/450,783, Field Dec. 17, 1982; Inventor: Nabil N. Youssef, entitled METHOD AND APPARATUS FOR PLANTING SEEDS AND GROWING PLANTS Field: The field of the invention is methods and apparatus for planting and nurture of growing plants, particularly those which efficiently utilize growing space and minimize associated costs and labor.

State of the Art: Numerous apparatus and methods have been put forth for the germination of seeds and initial growth of the plants for subsequent replanting. The most common of these involve the germination and initial growth of the plant within an individual container such as a cup, Pot or the like, followed bY replanting into the final growth environment when the root system has grown appropriately within the confines of the container. The initial growing containers are often grouped into a single structure. For example, U.S. Pat. No. 3,667,159, features a group of chambers each upwardly flared to facilitate the removal of the plant, along with a cake of the initial seed germinating medium, for subsequent replanting. Other U.S. patents revealing similar plant nursing apparatus include Nos. 3,938,281, 4,058,931, and 3,949,523. All of these state of the art structures are adapted for removal of the plant and nursing cake for subsequent replanting into a final growing environment. U.S. Pat. No. 4,231,186 shows a structure of honeycomb appearance adapted to be unfolded into a single continuous string of seedling-containing enclosures adapted to subsequent machine planting. The walls of the enclosure must be adapted to prevent root penetration during nursing. All of these methods and apparatus are subject to the traditional problems of weed control after the replanting. This in turn generally requires cultivation, provided for by row planting and resulting in inefficiently low plant density in the growing area.

BRIEF SUMMARY OF THE INVENTION

With the foregoing in mind, the present invention eliminates or substantially alleviates the aforesaid disadvantages in the prior art, by providing a seed planting method for efficient utilization of growing space for seed germination and plant nurture to maturity without the conventional replanting step(s), along with associated apparatus. A group of adjoining, open-ended enclosures is placed upon a substrata of plant nutrient medium, generally the top soil of a growing plot, referred to herein as virgin soil. Each of the enclosures is filled with a plant nutrient medium adapted for seed germination and early plant growth, and referred to hereinafter as germinating soil mix, into which a seed is planted. The roots grow into the substrata and take nutrient from it as the plants grow to maturity. The adjoining enclosures are generally equal in size and evenly spaced, the size preferably being selected so that the seeds are spaced for efficient use of the growing space upon which the enclosure group rests. Although not essential, the germinating soil mix is preferably selected from state of the art formulations to be sterile, with no viable foreign seeds, and advantageously also with no viable eggs or developing forms of plant harmful arthropods nor harmful soil microbes such as fungi and bacteria. Since the germinating soil mix within the enclosures also forms an effective light barrier to prevent germination of foreign seeds in the substrata, no weed seeds germinate, so that cultivation of the growing plot is not needed subsequent to planting. The roots of the plants grow unrestrainedly into the substrata, utilizing its nutrients and forming the normal root systems required for healthy growth of each plant. The inefficient, space wasting conventional row planting required for weed control cultivation is avoided.

Initial germination of the seeds and early growth of the plants may be accelerated by providing a sunlight admitting sheet, as of clear plastic, installed upon the top of the group of enclosures, producing a warming greenhouse effect. The germinating soil mix may also serve as mulch for retention of sub-soil moisture.

For economy and ease of storage and shipment, it is preferred that the enclosures be of construction similar to the expandable paper structure sometimes called "honeycomb," and often utilized with facing paper sheets to make up paper or cardboard panels. The structure comprises a multiplicity of adjacent straight strips of paper arranged in adjoining pairs of strips so glued together that the group of equally spaced enclosures may be created by pulling the two end strips of the group apart laterally, the strips bending to form the group of enclosures. The group is then secured in expanded form to the substrata of soil as by pegging.

The paper is preferably untreated and biodegradable, so that the growing plot may be subsequently tilled without removal of the enclosure groups. However, treated paper, or other materials, may be used if re-use is desired.

A variation of the above described method enables the pregermination of the seeds before outdoor planting. The enclosure group is attached upon a stiffening member, such as a plywood board, in a greenhouse or other sheltered enclosure, the germinating soil mix is placed within the enclosures, the seeds are planted, and time allowed for germination and initial growth. The group is then carried upon the supporting member outdoors to the growing plot, where it is transferred from the supporting member directly onto the virgin soil.

BRIEF DESCRIPTION OF THE DRAWINGS

In the drawings, which represent the best mode presently contemplated for carrying out the invention.

DETAILED DESCRIPTION OF ILLUSTRATED EMBODIMENTS

The method and associated apparatus for planting germinative seeds and providing for the growth of the plants is now described in detail with reference to the figures.

Figure 1:
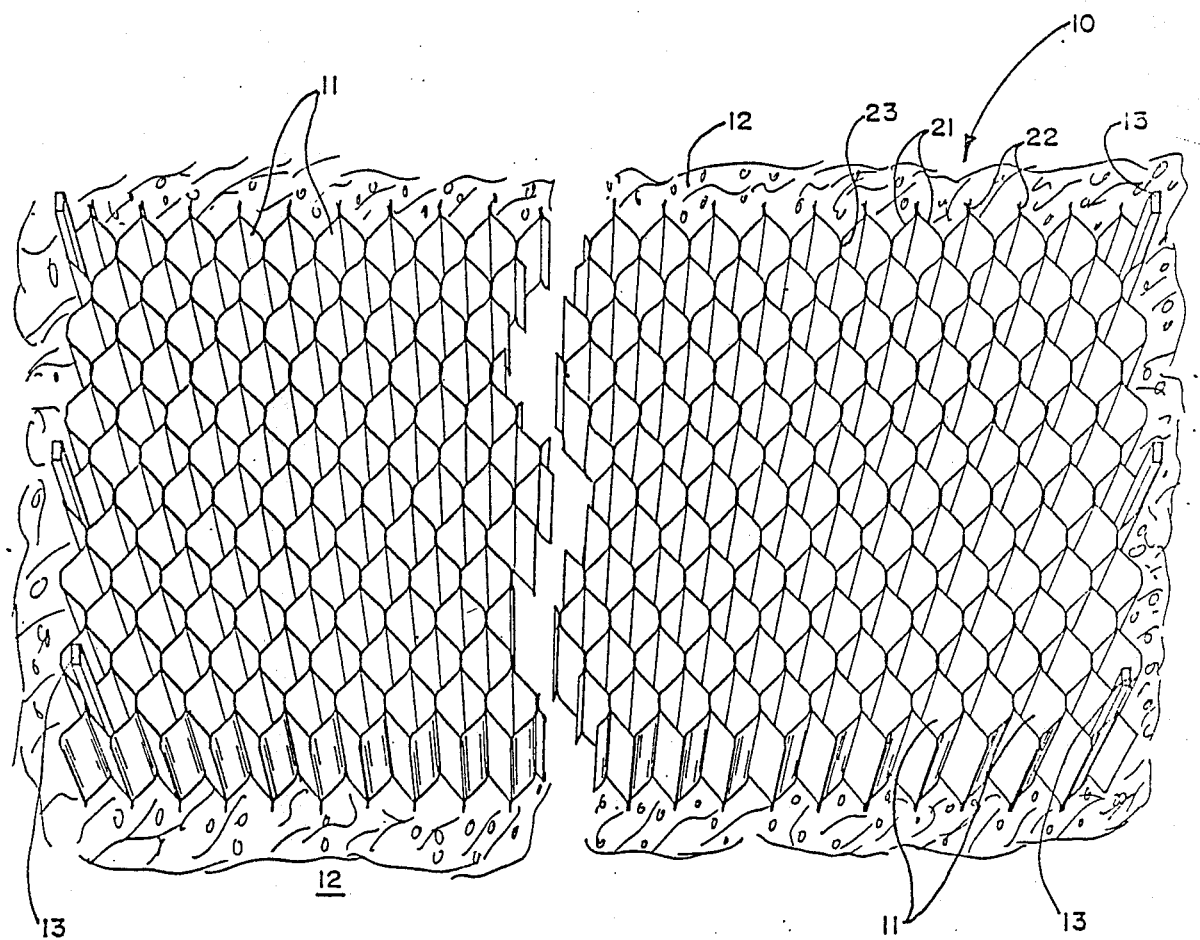
FIG. 1 illustrates a group of adjoining planting enclosures, fragmentally represented, secured to a nutrient substrata of virgin garden soil, in accordance with the method and apparatus of the invention, FIG. 2 a fragment of the enclosure group of FIG. 1 being filled with a germinating soil mix, drawn to the same scale, FIG. 3 seeds being planted within the germinating soil mix within the enclosures of a portion of the fragment of FIG. 2, drawn to the same scale, FIG. 4 a section of a fragment of the enclosure group of FIG. 3, taken along line 4—4 thereof, showing the roots of the plants growing into the nutrient substrata of virgin soil, drawn to a larger scale, FIG. 5 a side elevation view of a group of adjoining planting enclosures secured to a rigid base member preparatory to the filling of the enclosures and the planting of seeds therein for germination and initial root growth within a sheltered environment, FIG. 6 an end elevation view of the enclosure group of FIG. 5, taken along line 6—6 thereof, being transferred from the base member onto a substrata of virgin soil, the seeds having germinated and produced seedlings within a protected environment, drawn to the same scale as FIG. 5, FIG. 7 a side elevation view of a preferred embodiment of the enclosure group in accordance with the invention, comprising a collapsed stack of straight strips of flexible paper serially glued together in selected locations, FIG. 8 a side elevation view of the collapsed enclosure of FIG. 7, taken along line 8—8 thereof, drawn to the same scale, FIG. 9 an end elevation view of the collapsed enclosure group of FIG. 8 taken along line 9—9 thereof, drawn to the same scale, and FIG. 10 an elevation view of the enclosure group of FIG. 7, shown being expanded to form the individual enclosures thereof, drawn to the same scale.

In FIG. 1 a group 10 of individual enclosures 11 is illustrated held in place upon the soil 12 of a growing plot as by wooden pegs 13 extending through enclosures 11 at the ends of group 10 into the underlying soil 12. As discussed subsequently, the enclosure group 10 is preferably formed of expandable honeycomb paper. The soil 12 is hereinafter referred to as "virgin soil" to distinguish it from prepared plant nutrient mediums such as may be used in greenhouses and the like.

Figure 2:
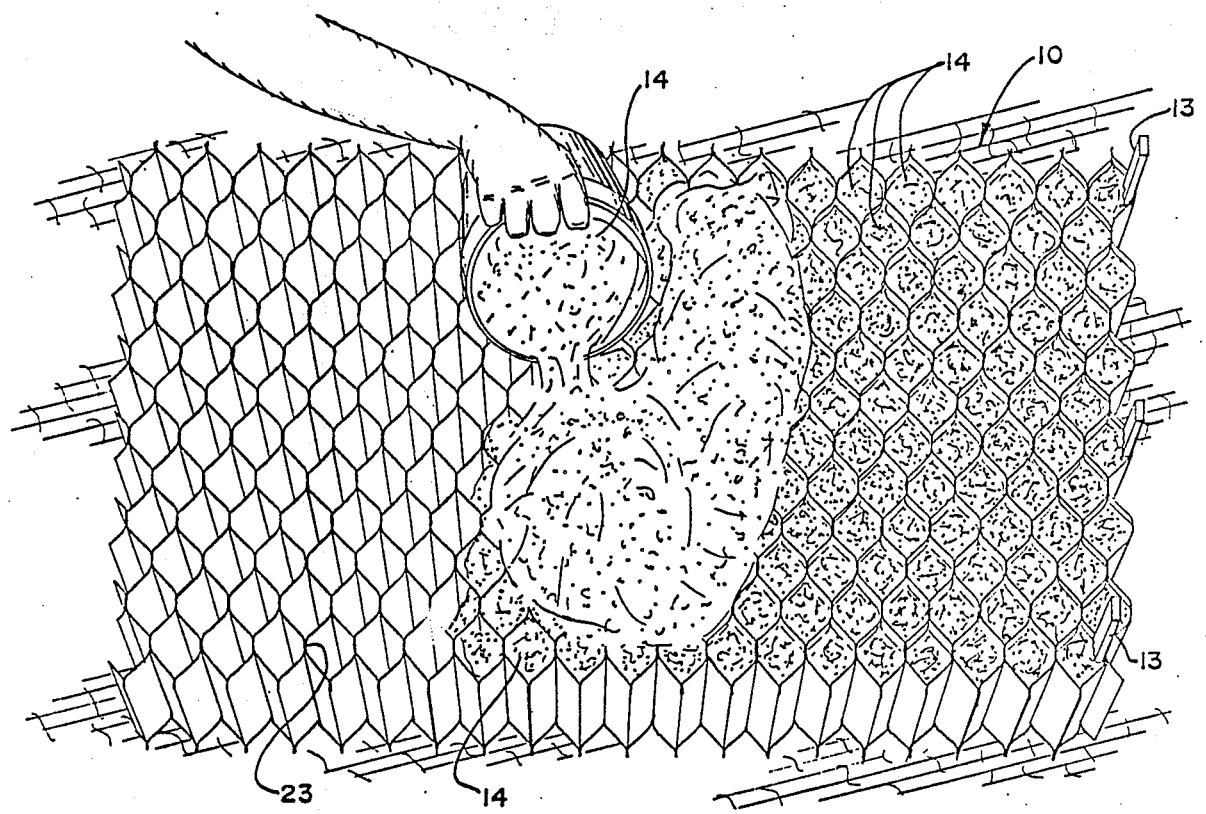

In FIG. 2, the enclosures 11 are shown being filled with a germinating soil mix 14. Soil mix 14 may be selected from among state of the art formulations, such as sand with selected granules of graded sizes, peat, sphagnum moss, vermiculite, perlite, compost, and commercial mixes such as "peat-lite Mix." It may include fertilizers, and selected herbicides, and insecticides. It is greatly preferred that the selected soil mix 14 be pre-treated to be sterile, containing no viable foreign seeds such as those of garden weeds. Preferably, it should also be free of viable arthropods (e.g. insects, spiders or other pests) whether as eggs or in subsequent stages of development, and plant pathogens such as fungi and bacteria.

Figure 3:
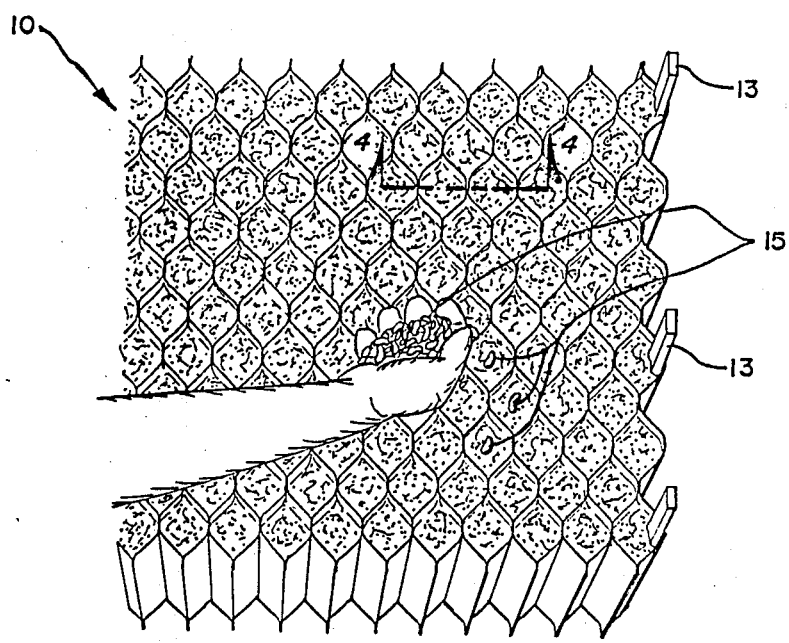

The planting of seeds 15 in the enclosures 11 is illustrated in FIG. 3. Normally, a single seed is placed in each enclosure and suitably covered by the germinating soil mix 14. However, it may be desirable to plant two or more seeds, for example to insure that at least one is viable, or to efficiently use the growing space when the enclosures 11 are larger than necessary for an individual plant. The enclosure group 10 is preferably selected to have enclosures 11 of a size appropriate to the particular plants to be grown, to assure that the garden plot is planted as densely as possible while providing each plant with its needed growing space However, when varieties requiring larger growing space are grown, it may for instance be advantageous to plant only in spaced apart enclosures. It may in some instances be desirable to plant differing plants in the same plot, as, for example, to provide leafy shade plants among other plants whose growth may be harmed by an excess of direct sunlight. In any event the growing space may be utilized efficiently while each plant has its needed growing space, the enclosure group serving as a ready plant spacing reference.

After the seeds 15 are planted, it is sometimes advantageous to provide a sunlight admitting cover 16, such as a clear plastic sheet, upon the top of group 10, to conserve moisture and heat within the enclosures, especially for early season or preseason planting. After germination of the seeds and initial plant growth, sheet 16 may be stored for later use. (FIG. 4)

Figure 4:
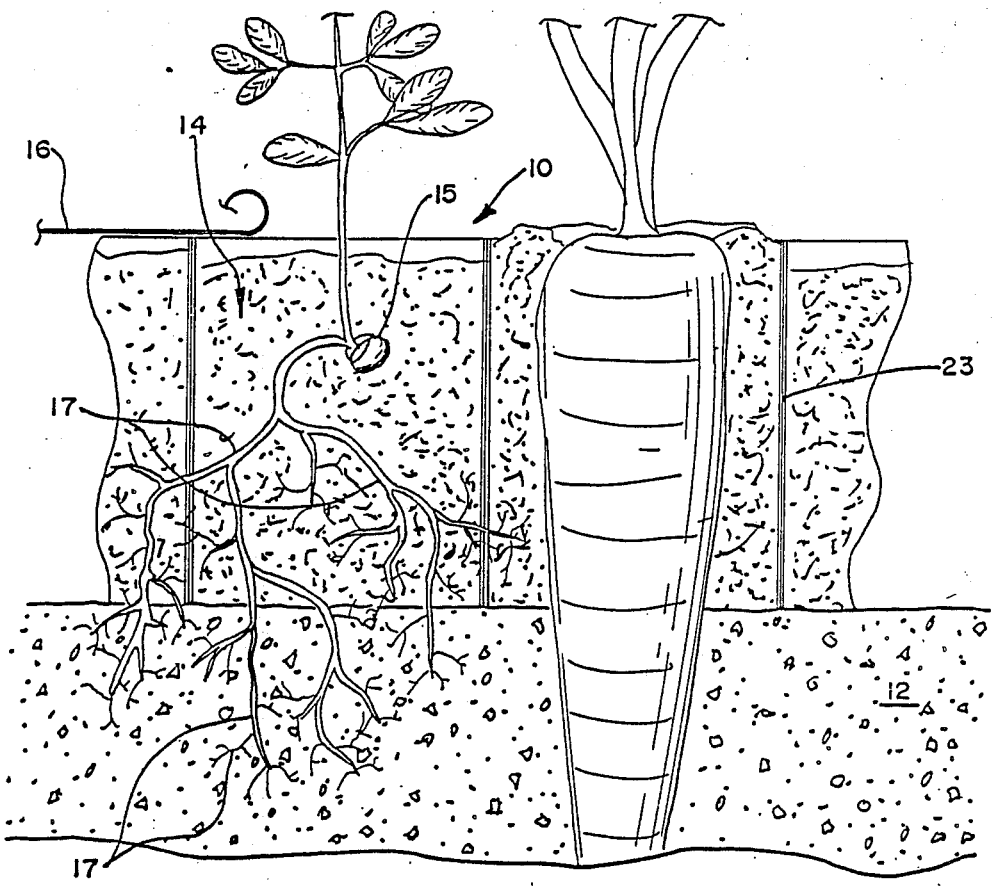

The roots 17 of the subsequently growing plants penetrate into the substrata of virgin soil 12, taking nutrient from it for full plant growth (FIG. 4). The roots 17 may in normal growth penetrate adjacent walls of the enclosures 11.

Figure 5:
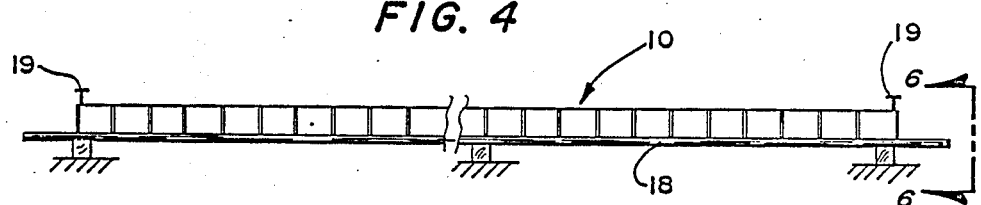
Figure 6:
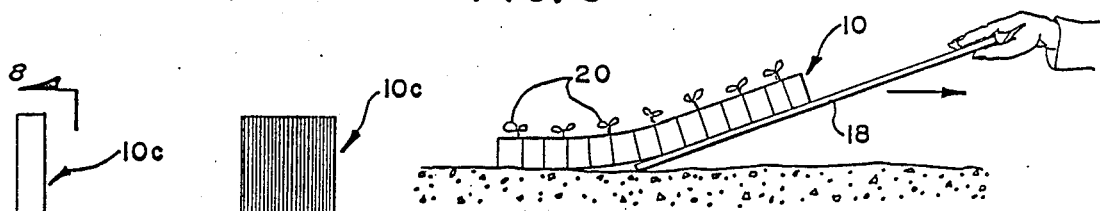

A variation in the above described procedure permits planting for initial seed germination and plant growth substantially before the normal outdoor growing season, in a sheltered indoor environment as provided by a greenhouse or the like. Enclosure group 10 is in this case preferably secured to a stiff base member such as a plywood board 18 (FIG. 5), as by nails 19 instead of the soil pegs 13. (FIG. 1) The germinating soil mix 14 is placed in enclosures 11 and the seeds 15 planted. After germination of the seeds 15, and perhaps a period for limited initial growth of seedlings 20, the enclosure group 10 is carried upon base member 18 to the outdoor garden site and removed from the supporting base 18 directly onto the virgin soil 12. (FIG. 6) Growth then proceeds to harvest, the roots growing downward to tap the nutrients of the virgin soil 12.

Figure 7:
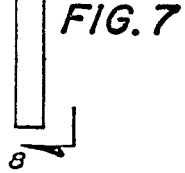
Figure 8:
Figure 9:
Figure 10:
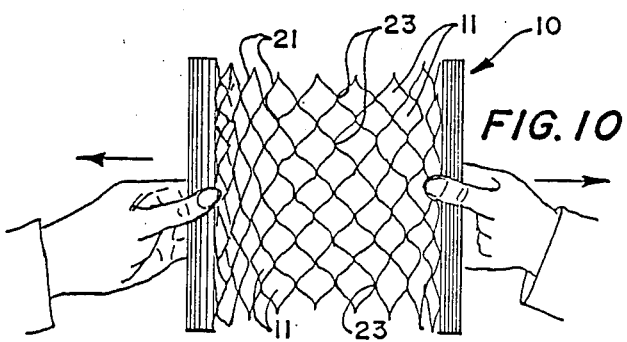

A collapsible paper structure similar to the familiar "honeycomb" is most preferred for enclosure group 10. (FIGS. 7–10) The honeycomb structure comprises numerous individual thin paper strips 21, which are arranged in pairs 22 secured together as by transverse bands 23 of glue at equal intervals along their lengths. Each pair is in turn similarly secured to its adjacent pair(s) at the midpoints of said intervals. (FIG. 10) The enclosure 10 may be compactly stored as a collapsed enclosure 10c, often referred to in the trade as a "slice" of honeycomb. (FIGS. 7-9) The slice may then at the time of use be expanded into enclosure group 10 by pulling the ends of slice 10c away from each other (FIG. 10), until the strips 21 all bend between glue bands 23 to form the walls of the individual enclosures 11. Enclosure group 10 may then, as previously described, be secured in expanded form to the virgin soil or other nutrient containing substrata.

Sterile germinating soil mix 14 is, as described above, preferred. However, it is well within the spirit of the invention to use initially unsterile germinating soil 14. Then, either the mix or the enclosure material may contain selected herbicides to selectively kill unwanted foreign plants, or that such materials be applied later in the growth period. For instance, seedicides may be applied after germination of the planted seeds. Insecticides, bactericides or fungicides may also be used. Other means of inhibiting weed growth may be employed. For small growing plots, such as in city or apartment gardening, sprouting weeds could be manually pulled out, or removed by careful manual cultivation with small tools. An opaque cover over the group of enclosures, perforated at each growing location may also be an acceptable method of weed control. With these weed control methods, the enclosure group 10 still serves as a plant spacing reference, and the advantage of densely planted growing space inherent in the basic method is preserved.

It is normally preferable that the material of enclosure group 10 be biodegradable so that it will decay, and the outdoor planting plot may be subsequently tilled without removal of the then decomposed material of enclosure group 10. A more durable, decay resistant material may be employed when re-use of the enclosures is desired, as discussed subsequently herein.

Although herein described for outdoor application, the method is equally applicable for indoor and greenhouse use. For such use, virgin soil 12 may be transported to form a growing bed. Or, other types of plant nutrient medium beds may be provided, such as are common for greenhouse use. To provide for re-use of the enclosure group 10, the paper may be impregnated or coated, as, for example, with epoxies. Or, it may be constructed of decay resistant plastic, especially applicable for repeated greenhouse use. A material of woven fabric could also be used. Also, while the collapsible groups 10c (FIGS. 7–10) is quite desirable for storage and transport, a non-collapsible matrix of enclosures may also be employed, of plastic for example or of non-woven fabric such as paper, without departure from the spirit of the invention. The illustrated manual planting of the seeds may of course be replaced by planting with appropriate tools or devices without departing from the spirit of the inventive method. Also, other methods of treatment of the material of the enclosure group 10 may be desirable, including treatment with fertilizing material, or growth promoters or inhibitors such as hormones, other growth regulators, and germination stimulants. Examples of fertilizers include potassium nitrate or sulfate, controlled availability fertilizers such as urea-formaldehyde, ammonium phosphate, super phosphate and others. Germination and/or root growth promoters include the gibberellines, kenetin, b-benzylanmino purine, PBA, indoleacetic acid, napthaleneacetic acid, phenoxy compounds (2-4D) and others.

The invention may be embodied in other specific forms and steps without departing from the spirit or essential characteristics thereof. The present embodiments and method is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U. S. Letters Patent is:

1. A method of planting seeds and growing plants, comprising the following steps in the following order:
   providing a group of adjoining enclosures secured together, each comprising joined, upstanding, continuous wall members having no apertures therethrough, both the top and the bottom of each enclosure being entirely open between said wall members;
   placing the group of enclosures upon the soil of a growing plot, the lowermost ends of the enclosures being in contact with said soil;
   filling each enclosure at least partially with a plant germinating soil mix;
   planting at least one seed in the germinating soil mix of at least selected ones of the group of enclosures; and
   allowing the seeds to germinate and the roots of the resulting plants to grow generally downward into the soil, and the plants to grow to harvestable maturity.

2. The method of claim 1, wherein:
   the plant germinating soil mix is free of viable seeds of foreign plants.

3. The method of claim 2, wherein:
   the soil mix is further free of viable life forms of plant harmful arthropods, and of viable plant harmful bacteria and fungi.

4. The method of claim 1, wherein the group of enclosures is provided by:
   providing a group of adjoining pairs of straight elongate strips of flexible sheet material, the strips of each pair being permanently secured together transversely at each of their ends and at equal intervals therealong, and the adjacent strips of adjoining pairs being permanently secured transversely together centrally to said intervals;
   forming the enclosure group by expanding the group of strips by lateral translation apart of the outermost strips of the end pairs of the group thereof; and
   securing the expanded enclosure group to the soil.

5. The method of claim 4, wherein:
   the group of enclosures is formed of biodegradable material.

6. The method of claim 1, wherein:
   the group of enclosures is formed of biodegradable material.

* * * * *